(12) United States Patent
Seki

(10) Patent No.: US 10,705,826 B2
(45) Date of Patent: Jul. 7, 2020

(54) CONTROL APPARATUS, PROGRAM UPDATING METHOD, AND COMPUTER PROGRAM

(71) Applicant: Sumitomo Electric Industries, Ltd., Osaka-shi (JP)

(72) Inventor: Ryusuke Seki, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/482,691

(22) PCT Filed: Dec. 4, 2017

(86) PCT No.: PCT/JP2017/043512
§ 371 (c)(1),
(2) Date: Jul. 31, 2019

(87) PCT Pub. No.: WO2018/142751
PCT Pub. Date: Aug. 9, 2018

(65) Prior Publication Data
US 2019/0354364 A1 Nov. 21, 2019

(30) Foreign Application Priority Data
Feb. 1, 2017 (JP) .................................. 2017-016606

(51) Int. Cl.
*G06F 9/445* (2018.01)
*G06F 9/44* (2018.01)
(Continued)

(52) U.S. Cl.
CPC ............ *G06F 8/65* (2013.01); *B60R 16/0231* (2013.01); *B60R 25/307* (2013.01); *B60W 50/00* (2013.01);
(Continued)

(58) Field of Classification Search
CPC ... G06F 8/63; G06F 8/654; G06F 8/65; G06F 8/658; B60R 16/0234; B60R 16/0231;
(Continued)

(56) References Cited

U.S. PATENT DOCUMENTS 7,366,589 B2* 4/2008 Habermas ............. B60L 3/0023
701/1
9,772,839 B2* 9/2017 Hong ........................ G06F 8/65
(Continued)

FOREIGN PATENT DOCUMENTS

JP 2007-065856 A 3/2007
JP 2007-164371 A 6/2007
(Continued)

OTHER PUBLICATIONS

Marc Torrent-Moreno et al., Vehicle-to-Vehicle Communication: Fair Transmit Power Control for Safety-Critical Information, Sep. 2009 IEEE, [Retrieved on Apr. 30, 2020]. Retrieved from the internet: <URL: https://ieeexplore.ieee.org/stamp/stamp.jsp?arnumber=4801661> 20 pp. 3684-3703 (Year: 2009).*
(Continued)

*Primary Examiner* — Anibal Rivera
(74) *Attorney, Agent, or Firm* — Baker Botts L.L.P.; Michael A. Sartori

(57) ABSTRACT

Provided is a control apparatus configured to control update of a control program of an on vehicle control device which controls target equipment installed in a vehicle. The control apparatus includes: a memory configured to store an update program for the control program; a determination unit configured to determine priority levels of a plurality of update programs stored in the memory: and a control unit configured to download the plurality of update programs according to the determined priority levels in descending order of the priority levels. The determination unit deter-
(Continued)

mines the priority levels on the basis of one or more safety indices that are associated with each of the plurality of update programs stored in the memory.

9 Claims, 9 Drawing Sheets

(51) Int. Cl.
*B60R 16/02* (2006.01)
*G06F 8/65* (2018.01)
*B60R 16/023* (2006.01)
*B60W 50/00* (2006.01)
*G06F 8/658* (2018.01)
*G06F 8/61* (2018.01)
*B60R 25/30* (2013.01)
*G06F 8/654* (2018.01)

(52) U.S. Cl.
CPC ....... *B60W 2050/0083* (2013.01); *G06F 8/63* (2013.01); *G06F 8/654* (2018.02); *G06F 8/658* (2018.02)

(58) Field of Classification Search
CPC ................ B60R 25/307; B60W 50/00; B60W 2050/0083
See application file for complete search history.

(56) References Cited

U.S. PATENT DOCUMENTS

| | | | | |
|---|---|---|---|---|
| 10,387,976 | B2* | 8/2019 | Kundu | H04L 65/605 |
| 2002/0087240 | A1* | 7/2002 | Raithel | B60R 16/0234 |
| | | | | 701/33.4 |
| 2005/0107929 | A1* | 5/2005 | Haydn | G01C 21/26 |
| | | | | 701/33.4 |
| 2006/0059480 | A1* | 3/2006 | Kimoto | G06F 8/65 |
| | | | | 717/172 |
| 2007/0005948 | A1* | 1/2007 | Kuhls | G06F 8/65 |
| | | | | 713/1 |
| 2007/0021844 | A1* | 1/2007 | Kuhls | G06F 8/65 |
| | | | | 700/11 |
| 2011/0271275 | A1* | 11/2011 | Ochi | G06F 8/63 |
| | | | | 717/177 |
| 2015/0358329 | A1* | 12/2015 | Noda | H04W 12/0802 |
| | | | | 726/4 |
| 2016/0080340 | A1* | 3/2016 | Oba | H04L 63/065 |
| | | | | 713/176 |
| 2016/0297401 | A1* | 10/2016 | Haga | B60R 25/307 |
| 2017/0134164 | A1* | 5/2017 | Haga | G06F 8/654 |
| 2018/0032324 | A1* | 2/2018 | Sarkar | G06F 8/658 |

FOREIGN PATENT DOCUMENTS

| | | |
|---|---|---|
| JP | 2011-090457 A | 5/2011 |
| JP | 2012-123418 A | 6/2012 |
| JP | 2015-060381 A | 3/2015 |
| WO | 2008/050410 A1 | 5/2008 |
| WO | 2008/126259 A1 | 10/2008 |
| WO | 2011/135629 A1 | 11/2011 |

OTHER PUBLICATIONS

Lofti ben Othmane et al., Towards Extended Safety in Connected Vehicles, Oct. 6-9, 2013, [Retrieved on Apr. 30, 2020]. Retrieved from the internet: <URL: https://ieeexplore.ieee.org/stamp/stamp.jsp?arnumber=6728305> 6 pp. 652-657 (Year: 2013).*

* cited by examiner

FIG. 7

| UPDATE PROGRAM | ASIL | SECURITY LEVEL | PRIORITY LEVEL |
|---|---|---|---|
| Δ1 | C | A | 1 |
| Δ2 | QM | QM | 4 |
| Δ3 | QM | C | 2 |
| Δ4 | QM | QM | 4 |

CONTROL APPARATUS, PROGRAM UPDATING METHOD, AND COMPUTER PROGRAM

TECHNICAL FIELD

The present invention relates to a control apparatus, a program updating method, and a computer program.

This application claims priority on Japanese Patent Application No. 2017-016606 filed on Feb. 1, 2017, the entire contents of which are incorporated herein by reference.

BACKGROUND ART

In the automotive field in recent years, vehicles have been progressed in functionality, and a diverse range of devices are installed on vehicles. Accordingly, vehicles are equipped with large numbers of control devices, so-called ECUs (Electronic Control Units), (or controlling these on-vehicle devices.

Examples of types of ECUs include: traveling-type ECUs that control an engine, a brake, an EPS (Electric Power Steering), and the like in response to operations on an accelerator, a brake, and a handle; body-type ECUs that control ON/OFF of interior lights and headlights, sound of an alarm unit, and the like in response to switch operations performed by an occupant; and meter-type ECUs that control operations of meters arranged near the driver's seat.

Generally, each ECU consists of an arithmetic processing unit such as a microcomputer, and implements a control of an on-vehicle device by reading out a control program stored in a an ROM (Read Only Memory), and executing the read control program.

Control programs of ECUs may differ depending on the shipping destinations, grades, etc., of vehicles. Therefore, old versions of control programs need to be overwritten with new versions of control programs in response to upgrading of control programs.

For example, Patent Literature 1 discloses a system which receives a correction program for correcting a vehicle control program from an information providing center that is an external device, and which rewrites the vehicle control program by using the correction program in response to a request from the information providing center.

Patent Literature 2 discloses a system in which update information for map information is distributed to an on-vehicle navigation device. In this system, a vehicle preferentially receives update information conformable to the state thereof.

CITATION LIST

Patent Literature

PATENT LITERATURE 1: Japanese Laid-Open Patent Publication No. 2007-65856
PATENT LITERATURE 2: Japanese Laid-Open Patent Publication No. 2012-123418

SUMMARY OP INVENTION

According to one embodiment, a control apparatus is configured to control update of a control program of an on-vehicle control device which controls target equipment installed in a vehicle. The control apparatus includes: a memory configured to store an update program for the control program; a determination unit configured to determine priority levels of a plurality of update programs stored in the memory; and a control unit configured to download the plurality of update programs according to the determined priority levels, in descending order of the priority levels. The determination unit determines the priority levels on ore the basis of one more safety indices that are associated with each of the plurality of update programs stored in the memory.

According to another embodiment, a program updating method is a method of updating a control program of an on-vehicle control device which controls target equipment installed in a vehicle. The method includes the steps of: storing an update program for the control program in a memory; determining priority levels of a plurality of update programs stored in the memory; and downloading, the plurality of update programs according to the determined priority levels, in descending order of the priority levels. In the step of determining the priority levels, the priority levels are determined on the basis of one or more safety indices that are associated with each of the plurality of update programs stored in the memory.

According to still another embodiment, a computer program causes a computer to function as a control apparatus configured to control update of a control program of an on-vehicle control device which controls target equipment installed in a vehicle. The computer includes a memory configured to store an update program for the control program. The computer program causes the computer to function as: a determination unit configured to determine priority levels of a plurality of update programs stored in the memory; and a control unit configured to download the plurality of update programs according to the determined priority levels, in descending order of the priority levels. The determination unit determines the priority levels on the basis of one or more safety indices that are associated with each of the plurality of update programs stored in the memory.

BRIEF DESCRIPTION OF DRAWINGS

FIG. 7 is a diagram for describing a method of determining priority levels for download in the DL server.

DESCRIPTION OF EMBODIMENTS

Figure 1:
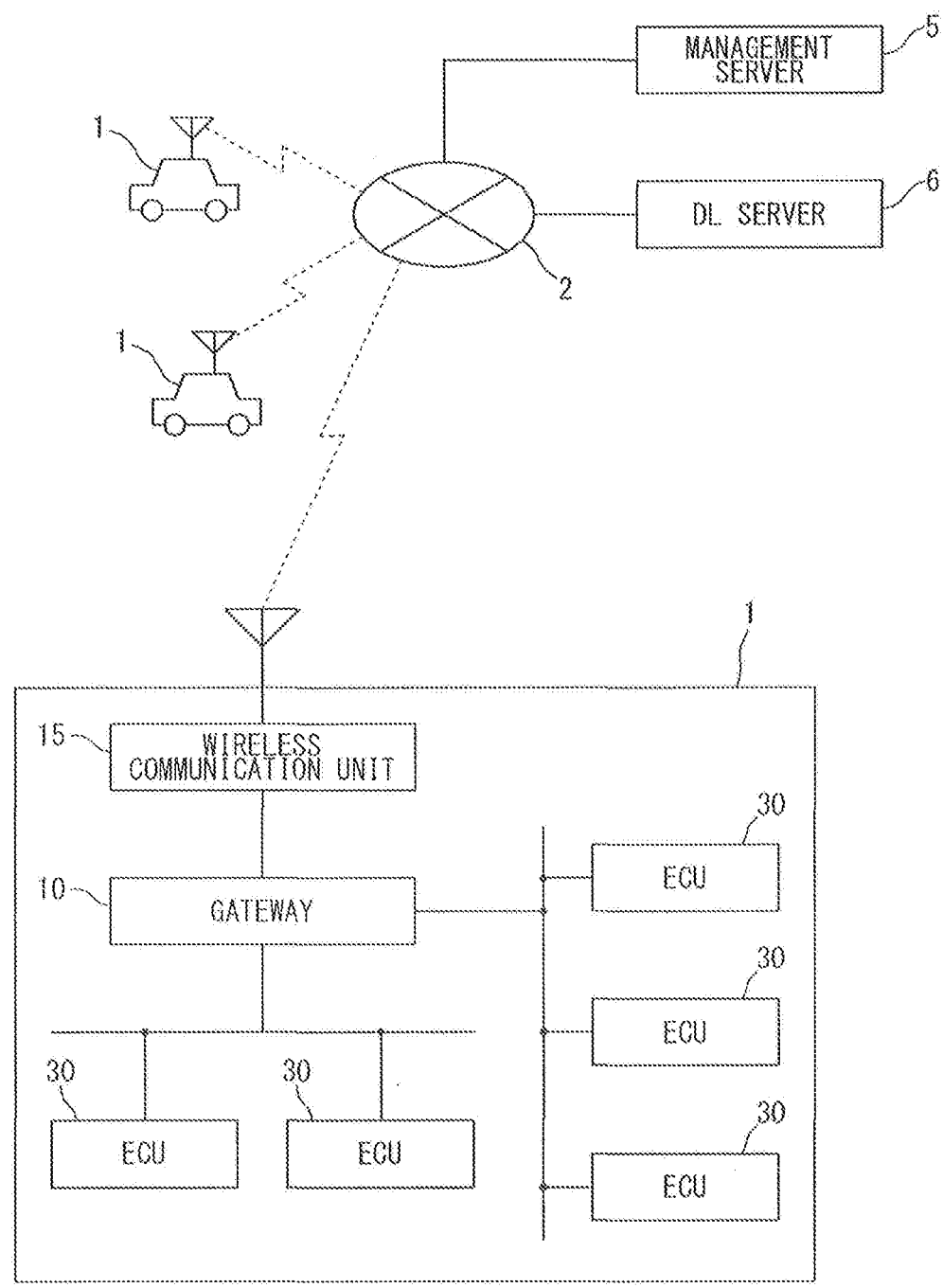
FIG. 1 is a diagram showing an overall configuration of a program updating system according to an embodiment.

Problems to be Solved by the Present Disclosure

Considering safety of a vehicle, an update program having a high urgency level, such as an update program regarding safety, needs to be preferentially downloaded.

An object in one aspect of the present disclosure is to provide a control apparatus, a program updating method, and a computer program which allow download of a plurality of update programs for control programs in the order considering safety of a vehicle.

Effect of the Present Disclosure

According to this disclosure, a plurality of update programs for control programs can be downloaded in the order considering safety of a vehicle.

Description of Embodiments

The present embodiment includes at least the following.

That is, a control apparatus included in the present embodiment is a control apparatus configured to control update of a control program of an on-vehicle control device which controls target equipment installed in a vehicle. The control apparatus includes: a memory configured to store an update program for the control program; a determination unit configured to determine priority levels of a plurality of update programs stored in the memory; and a control unit configured to download the plurality of update programs according to the determined priority levels, in descending order of the priority levels. The determination unit determines the priority levels on the basis of one or more safety indices that are associated with each of the plurality of update programs stored in the memory.

Since the plurality of update programs are downloaded according to the priority levels based on the one or more safety indices in descending order of the priority levels, an update program having a higher priority level hosed on the safety indices is download with higher priority. Therefore, a control program having a higher priority level based on the safety indices is updated more promptly, Thus, safety of the vehicle can be promptly improved.

Preferably, the safety indices include at least one of an index of functional safety and an index of security.

Thus, the update programs are downloaded in the priority order in which, at least one of functional safety and security assurance is considered.

Preferably, in a case where a new update program is stored in the memory while an update program is being downloaded, and if the priority level of the new update program is higher than the priority level of the update program being downloaded, the control unit suspends download of the update program being downloaded, and downloads the new update program.

Thus, an update program for a control program having a higher urgency level is downloaded with higher priority in a flexible manner, and update of the control program is performed with higher priority. Therefore, safety of the vehicle can be promptly improved.

Preferably, in a case where a new update program is stored in the memory while an update program is being downloaded and the priority level of the new update program is higher than the priority level of the update program being downloaded, the control unit downloads the new update program after completion of download of the update program being downloaded.

Thus, download of the update program being downloaded can be completed without interruption.

Preferably, the control unit downloads the plurality of update programs according to the priority levels in descending order of the priority levels, and requests update of control programs in descending order of the priority levels.

Thus, a control program having a higher urgency level is updated with higher priority.

Preferably, an algorithm for determining the priority levels of the update programs by the determination unit is changeable.

Thus, the priority order can be flexibly changed along with a change in evaluation of safety, an increase in performance, etc.

A program updating method included in the present embodiment is a method of updating a control program of an on-vehicle control device which controls target equipment installed in, a vehicle. The method includes the steps of: storing an update program for the control program in a memory; determining a priority order of a plurality of update programs stored in the memory; determining priority levels of the plurality of update programs stored in the memory; and downloading the plurality of update programs according to the determined priority levels, in descending order of the priority levels. In the step of determining the priority levels, the priority levels are determined on the basis of one or more safety indices that are associated with each of the plurality of update programs stored in the memory.

Since the plurality of update programs are downloaded according to the priority levels based on the one or more safety indices in descending order of the priority levels, an update program having a higher priority level based on the safety indices is downloaded with higher priority. Therefore, a control program having a higher priority level is updated more promptly. Thus, safety of the vehicle can be promptly improved.

A computer program included in the present embodiment is a computer program for causing a computer to function as a control apparatus configured to control update of a control program of an on-vehicle control device which controls target equipment installed in a vehicle. The computer includes a memory configured to store an update program for the control program. The computer program causes the computer to function as: a determination unit configured to determine priority levels of a plurality of update programs stored in the memory; and a control unit configured to download the plurality of update programs according to the determined priority levels, in descending order of the priority levels. The determination unit determines the priority levels on the basis of one or more safety indices that are associated with each of the plurality of update programs stored in the memory.

Since the plurality of update programs are downloaded according to the priority levels based on the one or more safety indices in descending order of the priority levels, an update program having a higher priority level based on the safety indices is downloaded with higher priority. Therefore, a control program having a higher priority level is updated more promptly. Thus, safety of the vehicle can be promptly improved.

Detailed Description of Embodiments

Hereinafter, preferred embodiments will be described with reference to the drawings, in the following description, the same reference numerals refer to the same components and constituent elements. The names and functions thereof are also the same. Therefore, repeated description thereof is not necessary.

First Embodiment

Overall Configuration of System

FIG. 1 is a diagram showing an overall configuration of a program updating system according to a first embodiment.

As shown in FIG. 1, the program updating system of this embodiment includes vehicles 1, a management server 5, and a DL (download) server 6 which are communicable with each other via a wide-area communication network 2.

The management server 5 manages update information of each vehicle 1. The DL server 6 stores update programs therein. The management server 5 and the DL server 6 are operated by, for example, the automobile manufacturer of the vehicles 1, and are able to communicate with large numbers of vehicles 1 owned by users registered as members in advance.

Each vehicle 1 is equipped with a gateway 10, a wireless communication unit 15, a plurality of ECUs 30, and various on-vehicle devices (not shown) controlled by the respective ECUs 30.

A plurality of communication groups, each being formed by a plurality of ECUs 30 bus-connected to a common in-vehicle communication line, are present in each vehicle 1, and the gateway 10 relays communication between the communication groups. Therefore, a plurality of in-vehicle communication lines are connected to the gateway 10.

The wireless communication unit 15 is communicably connected to the wide-area communication network 2 such as a mobile phone network, and is connected to the gateway 10 by an in-vehicle communication line. The gateway 10 transmits, to the ECUs 30, information received by the wireless communication unit 15 from external devices such as the management server 5 and the DL server 6 through the wide-area communication network 2.

The gateway 10 transmits information obtained from the ECUs 30 to the wireless communication unit 15, and the wireless communication unit 15 transmits the information to the external devices such as the management server 5.

As an example of the wireless communication unit 15 mounted in the vehicle 1, a device possessed by the user of the vehicle 1, such as a mobile phone, a smart phone, a tablet-type terminal, or a notebook PC (Personal Computer), is conceivable, apart from an exclusive on-vehicle communication terminal.

In FIG. 1, the gateway 10 communicates with the external devices via the wireless communication unit 15. However, when the gateway 10 has a function of wireless communication, the gateway 10 may be configured to perform wireless communication with the external devices such as the management server 5.

In the program updating system shown in FIG. 1, the management server 5 and the DL server 6 are configured as separate servers. However, these servers 5 and 6 may be configured as a single server unit.

Internal Configuration of Gateway

Figure 2:
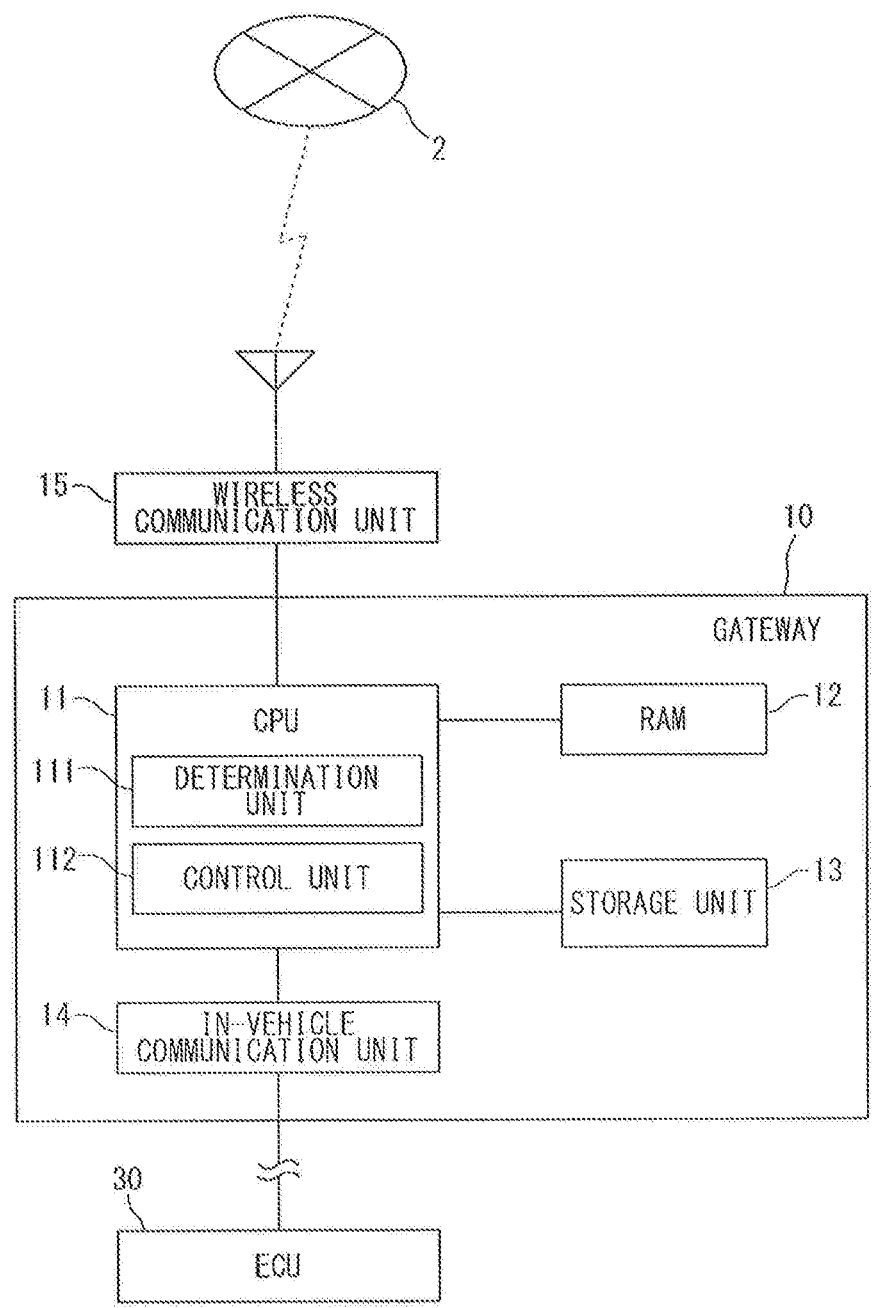
FIG. 2 is a block diagram showing an internal configuration of a gateway.

FIG. 2 is a block diagram showing the internal configuration of the gateway 10.

As shown in FIG. 2, the gateway 10 includes a CPU 11, an RAM (Random Access Memory) 12, a storage unit 13, an in-vehicle communication unit 14, and the like. Although the gateway 10 is connected to the wireless communication unit 15 via the in-vehicle communication line, the gateway 10 and the wireless communication unit 15 may be configured as a single unit.

The CPU 11 causes the gateway 10 to function as a relay device for relaying various kinds of information, by reading out one or a plurality of programs stored in the storage unit 13 to the RAM 12, and executing the read programs.

The CPU 11 can execute a plurality of programs in parallel by switching between the plurality of programs in a time-sharing manner, for example. The CPU 11 may be a CPU representing a plurality of CPU groups. In this case, a function to be implemented by the CPU 11 is a function to be implemented by the plurality of CPU groups in cooperation with each other. The RAM 12 consists of a memory element such as an SRAM (Static RAM) or a DRAM (Dynamic RAM), and temporarily stores therein programs to be executed by the CPU 11, data required in executing the programs, and the like.

A computer program to be implemented by the CPU 11 can be transferred in a state of being recorded in a well-known recording medium such as a CD-ROM or a DVD-ROM, or may be transferred by data transmission from a computer device such as a server computer.

In this aspect, the same applies to a computer program to be executed by a CPU 31 of the ECU 30 (refer to FIG. 3) described later, and a computer program to be executed by a CPU 51 of the management server 5 (refer to FIG. 4) described later.

In the following description, transfer (transmission) of a program from a lost device to a client device is also referred to as "download".

The storage unit 13 consists of, for example, a nonvolatile memory element such as a flash memory or an EEPROM (Electrically Erasable Programmable Read Only Memory). The storage unit 13 stores therein programs to be executed by the CPU 11, data required in executing the programs, and the like, and also stores therein update programs, of the respective ECUs 30, received front the DL server 6.

The plurality of ECUs 30 are connected to the in-vehicle communication unit 14 via the in-vehicle communication lines arranged in the vehicle 1. The in-vehicle communication unit 14 communicates with the ECUs 30 in accordance with a standard such as CAN (Controller Area Network), CANFD (CAN with Flexible Data Rate), LIN (Local interconnect Network), Ethernet (registered trademark), or MOST (Media Oriented Systems Transport: MOST is a registered trademark), for example.

The in-vehicle communication unit 14 transmits information provided from the CPU 11 to target ECUs 30, and provides information received from the ECUs 30 to the CPU 11. The in-vehicle communication unit 14 may communicate with the ECUs 30 in accordance with other communication standards that are used for an on-vehicle network, apart from the above communication standards.

The wireless communication unit 15 consists of a wireless communication apparatus including an antenna and a communication circuit that executes transmission/reception of radio signals through the antenna. The wireless communication unit 15 is able to communicate with the external devices when being connected to the wide-area communication network 2 such as a mobile phone network.

The wireless communication unit 15 transmits information provided from the CPU 11 to the external devices such as the management server 5 via the wide-area communication network 2 formed by a base station (not shown), and provides information received from the external devices to the CPU 11.

Instead of the wireless communication unit 15 shown in FIG. 2, a wired communication unit that functions as a relay device in the vehicle 1 may be adopted. The wired communication unit has a connector to which a communication cable conforming to a standard such as USB (Universal Serial Bus) or RS232 is connected, and performs wired communication with another communication device connected thereto via the communication cable.

When the other communication device and an external device such as the management server 5 are able to perform wireless communication via the wide-area communication network 2, the external device becomes communicable with the gateway 10 through a communication path including the external device, the other communication device, the wired communication unit, and the gateway 10 in this order.

Internal Configuration of ECU

Figure 3:
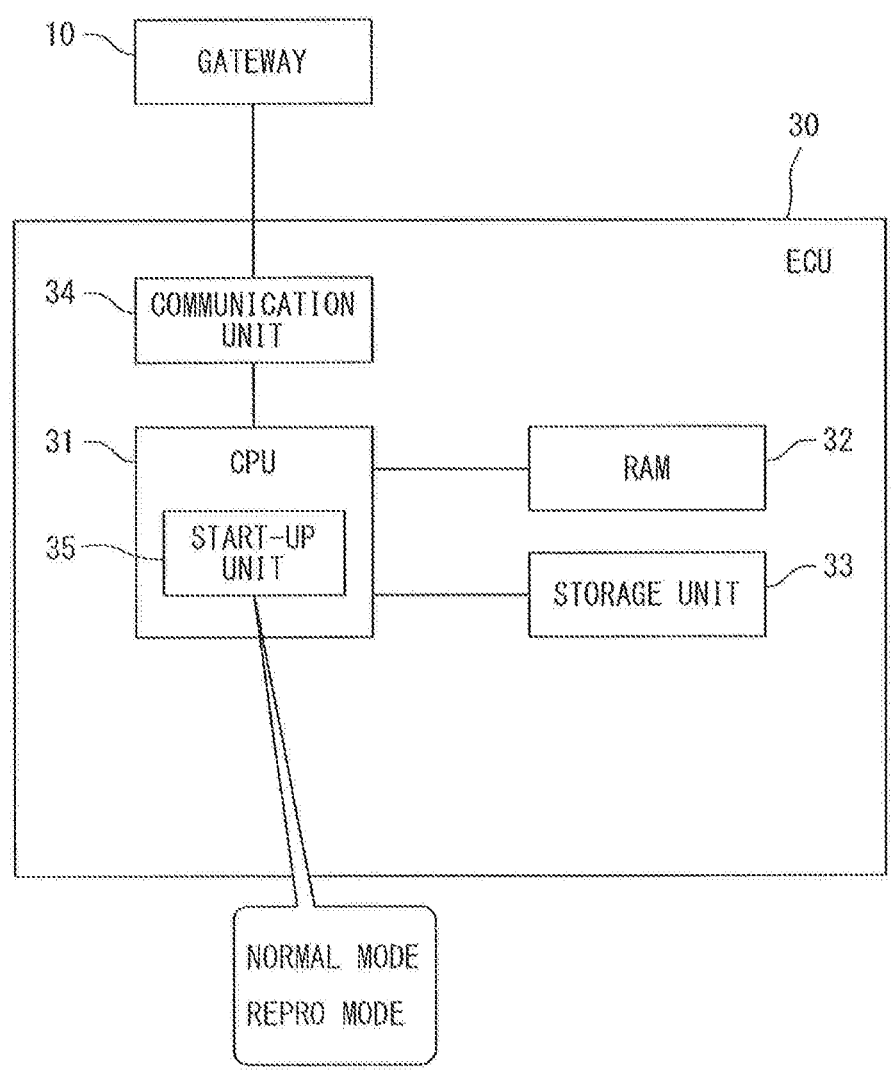
FIG. 3 is a block diagram showing an internal configuration of an ECU.

FIG. 3 is a block diagram showing an internal configuration of each ECU 30.

As shown in FIG. 3, the ECU 30 includes a CPU 31, an RAM 32, a storage unit 33, a communication unit 34, and the like. The ECUs 30 are on-vehicle control devices that individually control target equipment installed in the vehicle 1. Examples of the types of the ECUs 30 include a power supply control ECU, an engine control ECU, a steering control ECU, and a door lock control ECU.

The CPU 31 controls the operation of target equipment that the CPU 31 is in charge of, by reading out one or a plurality programs previously stored in the storage unit 33 to the RAM 32, and executing the read programs. The CPU 31 may also be a CPU representing a plurality of CPU groups, and control, to be performed by the CPU 31 may be control to be performed by the plurality of CPU groups in cooperation with each other.

The RAM 32 consists of a memory element such as an SRAM or a DRAM, and temporarily stores therein programs to be executed by the CPU 31, data required in executing the programs, and the like.

The storage unit 33 consists of, for example, a nonvolatile memory element such as a flash memory or an EEPROM or a magnetic storage device such as a hard disk.

The storage unit 33 stores therein the programs to be read and executed by the CPU 31. The information stored in the storage unit 33 includes, for example, a computer program (hereinafter referred to as "control program") that causes the CPU 31 to execute information processing for controlling target equipment that is an in-vehicle control target.

The gateway 10 is connected to the communication unit 34 via the in-vehicle communication line arranged in the vehicle 1. The communication unit 34 communicates with the gateway 10 in accordance with a standard such as CAN, Ethernet, or MOST, for example.

The communication unit 34 transmits information provided from the CPU 31 to the gateway 10, and provides information received from the gateway 10 to the CPU 31. The communication unit 34 may communicate with the gateway 10 in accordance with other communication standards that are used for the on-vehicle network, apart from the above communication standards.

The CPU 31 of the ECU 30 includes a start-up unit 35 that switches the mode of control performed by the CPU 31, between a "normal mode" and a "reprogramming mode" (hereinafter also referred to as "repro mode").

The normal mode is a control mode in which the CPU 31 of the ECU 30 executes original control for the target equipment (e.g., engine control for a fuel engine, door lock control for a door lock motor, etc.).

The reprogramming mode is a control mode for updating the control program used for control of the target equipment. That is, the reprogramming mode is a control mode in which the CPU 31 performs erasing and overwriting of the control program from/on an ROM area in the storage unit 33. Only when the CPU 31 is in this control mode, the CPU 31 is allowed to update the control program stored in the ROM area in the storage unit 33 to a new version of the control program.

When the CPU 31, in the repro mode, writes the new version of the control program into the storage unit 33, the start-up unit 35 temporarily restarts (resets) the ECU 30, and executes a verifying process on a storage area where the new version of the control program has been written.

After completion of the verifying process, the start-up unit 35 causes the CPU 31 to operate with the updated control program.

Internal Structure of DL Server

Figure 4:
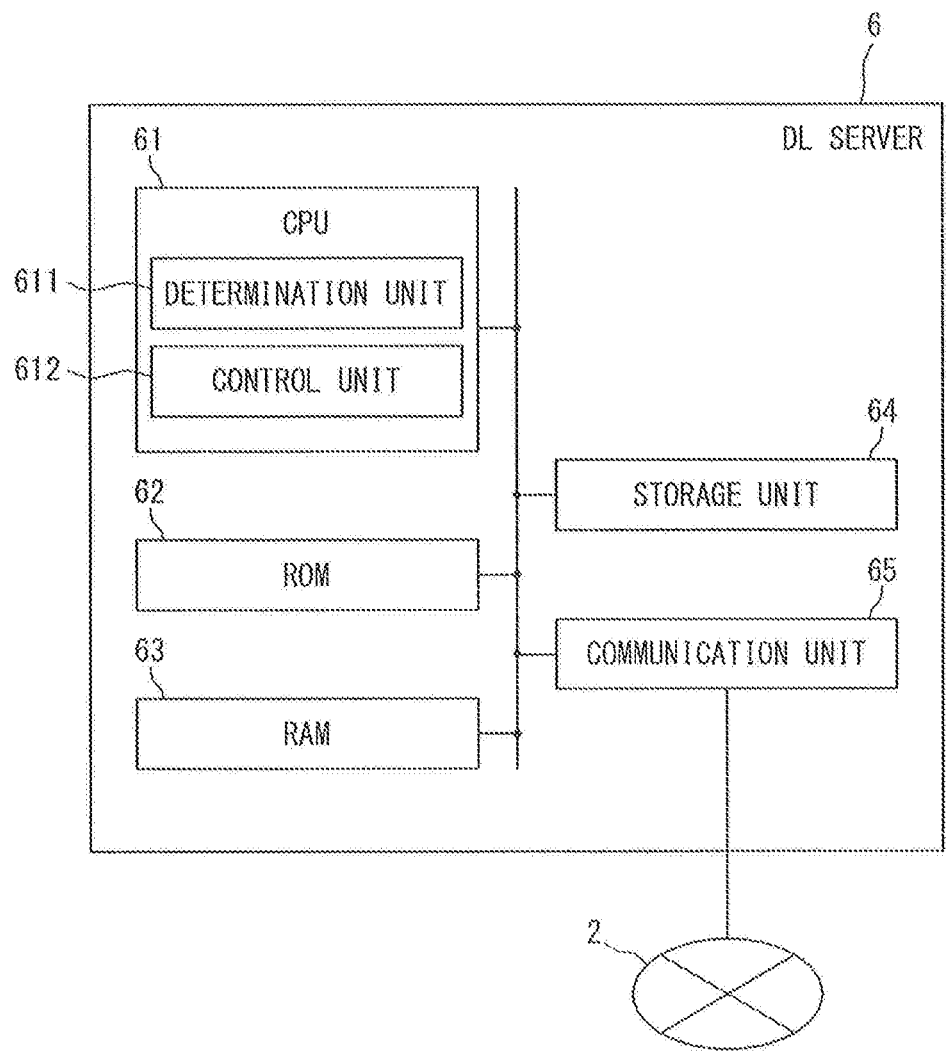
FIG. 4 is a block diagram showing an internal configuration of a DL (download) server.

FIG. 4 is a block diagram showing the internal structure of the DL server 6.

As shown in FIG. 4, the DL server 6 includes a CPU 61, an ROM 62, an RAM 63, a storage unit 64, a communication unit 65, and the like.

By reading out one or a plurality of programs previously stored in the ROM 62 to the RAM 63 and executing the read programs, the CPU 61 controls the operation of each hardware component, and causes the DL server 6 to function as an external device that is able to communicate with the gateway 10. The CPU 61 may also be a CPU representing a plurality of CPU groups, and a function to be implemented by the CPU 61 may be a function to be implemented by the plurality of CPU groups in cooperation with each other.

The RAM 63 consists of a memory element such as an SRAM or a DRAM, and temporarily stores therein programs to be executed by the CPU 61, data required in executing the programs, and the like.

The storage unit 64 consists of, for example, a nonvolatile memory element such as a flash memory or an EEPROM, or a magnetic storage device such as a hard disk. The storage unit 64 stores therein update programs to be downloaded.

The communication unit 65 consists of a communication device that executes a communication process in accordance with a predetermined communication standard. The communication unit 65 executes the communication process while being connected to the wide-area communication network 2 such as a mobile phone network. The communication unit 65 transmits information provided from the CPU 61 to external devices via the wide-area communication network 2, and provides information received via the wide area communication network 2 to the CPU 61.

Control Program Updating Sequence

Figure 5:
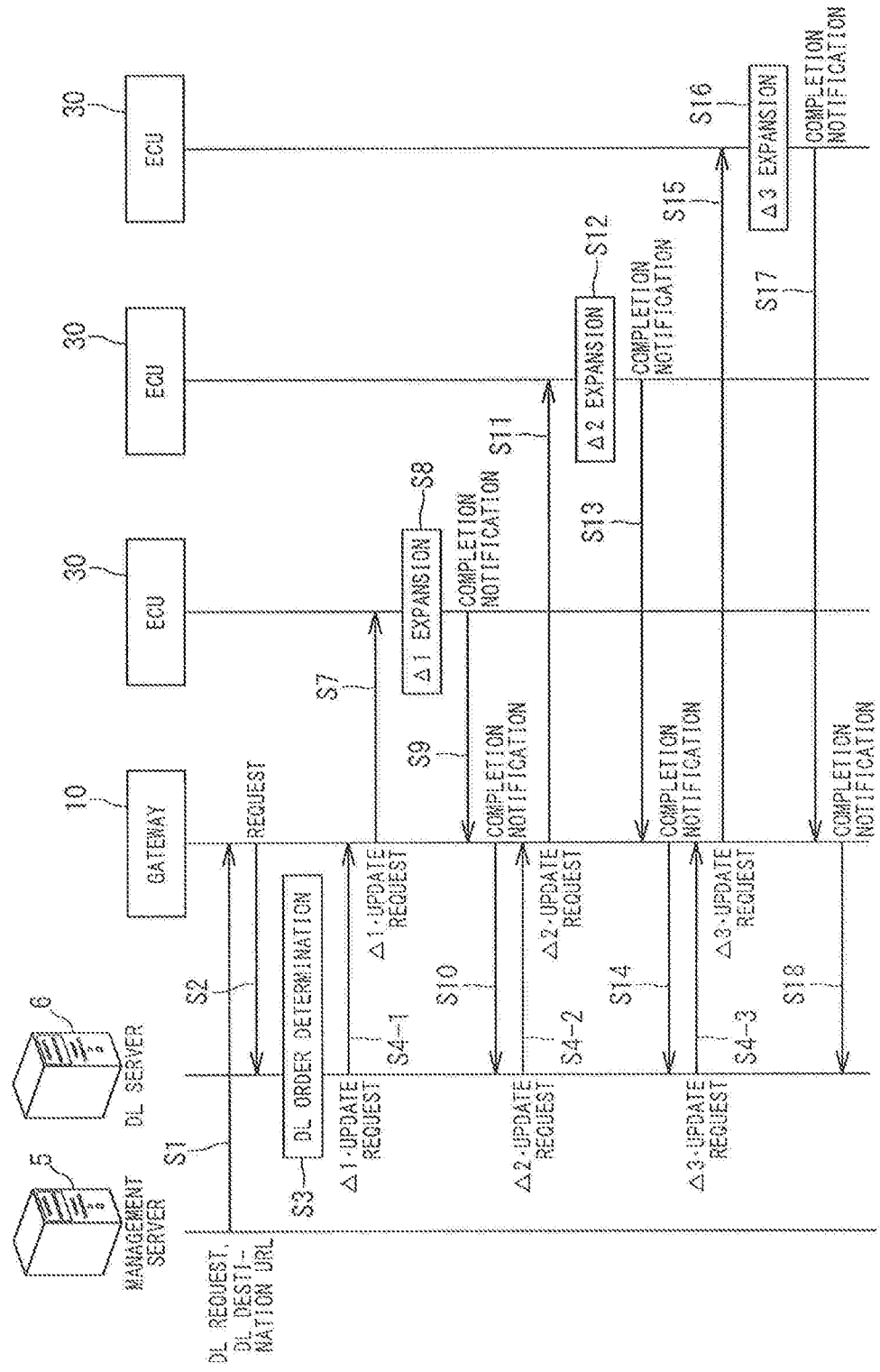
FIG. 5 is a sequence diagram showing an example of update of a control program, which is executed in a program updating system according to a first embodiment.

FIG. 5 is a sequence diagram showing an example of update of a control program, which is executed 111 the program updating system of the present embodiment. One or a plurality of update programs are stored in the DL server 6. As one example, the management server 5 determines a timing to update a control program of an ECU of a vehicle 1 which has been registered in advance. The update timing may be set by, for example, the automobile manufacturer of the vehicle 1.

When the timing to update the control program of the ECU has arrived, the management server 5 transmits a download request and a storage destination URL of the update program of the ECU 30, to the gateway 10 of the corresponding vehicle 1 (step S1). Upon receiving an update request from the management server 5, the gateway 10 requests the DL server 6 to download the update program (step S2).

In a case where a plurality of update programs to be downloaded are stored in the storage unit 64, the DL server 6, which has received the download request from the gateway 10, determines a download order (DL order) in which the plurality of update programs are to be downloaded (step S3). In step S3, the DL server 6 determines priority levels of the respective update programs on the basis of au index relating to safety (hereinafter referred to as "safety index") and downloads the plurality of update programs in the DL order based on the priority levels of the respective update programs. The DL order determination process in step S3 will be described later in detail.

The DL server 6 transmits a plurality of update programs Δ1 to Δ3 to the gateway 10 in accordance with the determined DL order, and: requests update of corresponding, control programs (steps S4-1 to S4-3).

After downloading the update programs Δ1 to Δ3, the gateway 10 transfers the update programs Δ1 to Δ3 to the target ECUs 30 according to the download order, and requests update of the control programs. The gateway 10 may request update of the control programs to the target ECUs 30 upon receiving permission for update of the control programs from the user.

Specifically; after downloading the update program Δ1 from the DL server 6 (step S4-1), the gateway 10 transfers the update program Δ1 to the target ECU 30, and requests update of the control program (step S7). The target ECU 30, which has downloaded the update program Δ1, expands the update program Δ1 according to the request from the gateway 10, and updates the control program (step S8). Upon completion of update, the target ECU 30 notifies the DL server 6 of the completion of update via the gateway 10 (steps S9, S10).

Next after downloading the update program Δ2 from the DL server 6 (step S4-2), the gateway 10 transfers the update program Δ2 to the target ECO 30 and requests update of the control program (step S11). The target ECU 30, which has downloaded die update program Δ2, expands the update program Δ2 according to the request from the gateway 10, and updates the control program (step S12). Upon completion of update, the target ECU 30 notifies the gateway 10 of the completion of update (steps S13, S14).

Next, after downloading the update program Δ3 from the DL server 6 (step S4-3), the gateway 10 transfers the update program Δ3 to the target ECU 30 and requests update of the control program (step S15). The target ECU 30, which has downloaded the update program Δ3, expands the update program Δ3 according to the request from the gateway 10, and updates the control program (step S16). Upon completion of update, the target ECU 30 notifies the gateway 10 of the completion of update (steps S17, S18).

Functional Configuration of DL Server

The CPU 61 of the DL server 6 includes functions represented by a determination unit 611 and a control unit 612 in FIG. 4, as functions for determining the DL order (step S3) and controlling download. These functions are implemented by the CPU 61 when the CPU 61 reads out one or a plurality of programs stored in the ROM 62, and executes the read programs. However, at least a part of the functions may be implemented by hardware such as an electronic circuit.

When there are a plurality of update programs to be downloaded, the function of the CPU 61 represented by the determination unit 611 (hereinafter, this function is referred to as "determination unit 611") determines the priority levels for download of the plurality of update programs.

Each update program is associated with a safety index. This index is transferred to the DL server 6 while being added to or associated with the update program.

Examples of safety of a vehicle include: functional safety of a traveling function a steering function, etc., for safety of the body and life of a user of the vehicle and safety of a person and an object outside the vehicle; and security ensuring for a vehicle body as a property and communication equipment connected to a network.

Regarding a standard for functional safety, for example, ISO 26262, which is defined by the ISO (International Organization for Standardization), has been known. The ISO 2626 defines ASIL (Automotive Safety Integrity Level) as an index of functional safety, and assigns levels of QM (Quality Management), A, B, C, and D to integrity requirements. A function that is assigned "D" is required to take a highest-level safety measure. A function that is assumed "A" is required to take a lowest-level safety measure. A function that is assigned "QM" is not relevant to safety. In the present embodiment, for the respective update programs, the ASIL is used as an index of functional safety of the functions that use the target control programs corresponding to the update programs.

Each update program is associated with at least one safety index. Preferably, each update program is associated with two safety indices. In the present embodiment, each update program is associated with an ASIL and a security level.

For each of the plurality of update programs, the determination unit 611 specifies the safety indices associated with the update program. Then, based on the associated safety indices, the determination unit 611 specifies a value indicating the priority level (hereinafter referred to as "priority level values") of each update program.

The determination unit 611 stores therein correspondence relation between one or more safety indices and the priority level values in advance. As an example of the correspondence relation, the determination unit 611 stores therein a relation graph indicating the priority level values with respect to the combination of the safety indices shown in FIG. 6. The determination unit 611 applies the safety indices associated with each update program to the relation graph shown in FIG. 6, thereby specifying the priority level value of the update program. That is, the determination unit 611 specifies the priority level value of the update program on the basis of the combination of two or more safety indices.

Figure 6:
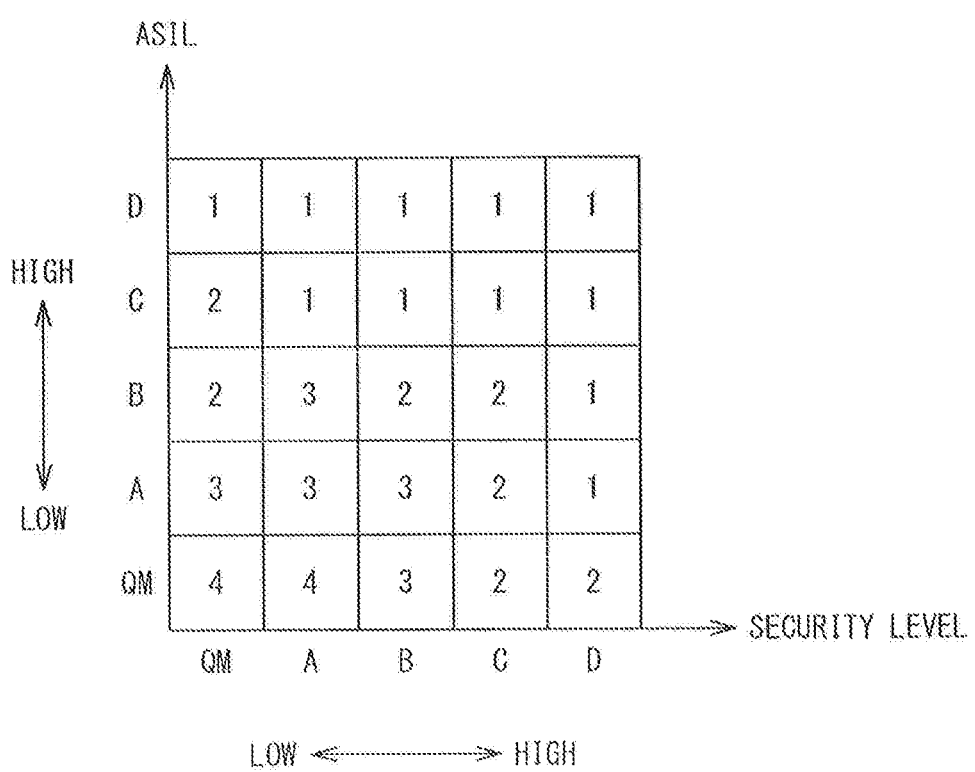
FIG. 6 shows a specific example of a relation graph showing the correspondence relation between one or more safety indices and priority values.

The relation graph shown in FIG. 6 has a vertical axis representing the ASIL and a horizontal axis representing the security level. The ASIL and the security levels increase in ascending order according to the scales on the axes. The relation graph shown in FIG. 6 is an example of a relation graph in which the priority level is high when at least one of the ASIL and the security level is high while the priority level is low when both the levels are low, and in which the priority level value is specified with the ASIL being considered to be somewhat more important than the security level. The relation shown in FIG. 6 is an example of the relation graph. The correspondence relation used by the determination unit 611 to specify the priority level values is not limited to the relation graph shown in FIG. 6. Instead of the relation graph, a function or a relational expression for calculating priority level values with the safety indices being variables, and a table representing correspondence between the safety indices and the priority level values, may be adopted. The correspondence relation itself stored in the DL, server 6 may be a target to be updated by using an update program provided from a provider of update programs such as an automobile manufacturer. In other words, an algorithm for determining the priority levels in the determination unit 611 and a parameter used in the algorithm may be changeable. The DL server 6 receives a program or a parameter for this change from the provider of update programs such as the automobile manufacturer or from another apparatus, and changes the algorithm or the parameter. Thus, the priority levels can be flexibly changed along with a change in evaluation of safety, an increase in performance, etc.

Instead of the safety indices, each update program may be associated with a priority level value that is specified based on the safety indices. In other words, each update program may be associated with a priority level value instead of one or more safety indices. In this case, the priority level value may be stored in the DL server 6 while being added to the update program or being associated with the update program.

The determination unit 611 determines the priority levels of the plurality of update programs, i.e., the DL order, based on the priority level values specified for the respective update programs. As one example, it is assumed that the smaller the priority level value is, the higher the priority level is and the earlier the update program is downloaded. Therefore, when there are no update programs having the same priority level value among the plurality of update programs, the determination unit 611 uses the priority level values of the respective update programs as they are. When there are update programs having the same priority level value, the determination unit 611 may further determine the priority levels of these update programs by applying a prescribed criterion to the update programs. Examples of the criterion include: date and time when each update program was created; the order in which each update program was provided from the provider of update programs such as the automobile manufacturer; and the data size. Alternatively the determination unit 611 may cause these update programs to remain at the same-priority level as per the DL order.

FIG. 7 is a diagram for describing a method of determining priority levels for download in the determination unit 611 of the DL server 6. In the example of FIG. 7, update programs Δ1 to Δ4 are a plurality of update programs whose priority levels are to be determined. The update program Δ1 is an update program for updating a steering control function, for example. The update program Δ2 is an update program for updating a navigation function, for example. The update program Δ3 is an update program for updating a security function, for example. The update program Δ4 is an update program for updating a map, for example.

With reference to FIG. 7, an ASIL "C" and a security level "A." are sot for the update program Δ1. An ASIL "QM" and a security level "QM" are set for the update program Δ2. An ASIL "QM" and a security level "C" are set for the update program Δ3. An ASIL "QM" and a security level are set for the update program Δ4.

With reference to the relation graph shown in FIG. 6, the determination unit 611 specifies the priority level value of the update program Δ1 with the ASIL "C" and the security level "A", as "1". The determination unit 611 specifics the priority level value of the update program Δ2 with the ASIL "QM" and the security level "QM", as "4". The determination unit 611 specifics the priority level value of the update program Δ3 with the ASIL "QM" and the security level "C", as "2". The determination unit 611 specifies the priority level value of the update program Δ4 with the ASIL "QM" and the security level "QM", as "4".

As one example, the determination unit 611 determines the priority levels of the respective update programs such that the smaller the priority level value of an update program is, the higher the priority level of the update program is, in other words, the earlier the update program is downloaded. Specifically, as for the update program Δ1 whose priority level value is "1" and the update program Δ3 whose priority level value is "2", the determination unit 611 determines that the priority level of the update program Δ1 is "1" indicating the highest level and the priority level of the update program Δ3 is "2" indicating the second highest level on the basis of the priority level values thereof because these priority level values do not overlap the priority level values of other update programs. As for the update program Δ2 and the update program Δ4 which are specified to have the same priority level value "4", the determination unit 611 determines the priority levels in chronological order of date and time when the update programs were created, for example. That is, in a case where the update program Δ4 was created earlier than the update program Δ2, the determination unit 611 determines that the priority level of the update program Δ4 is "3" indicating the higher level and the priority level of the update program Δ2 is "4" indicating the lower level.

The function of the CPU 61 represented by the control unit 612 (hereinafter, this function is referred to as "control unit 612") performs control to download the update programs in order front one having the highest priority level, which is the DL order according to the priority levels determined by the determination unit 611.

Schedule Determination Process

Figure 8:
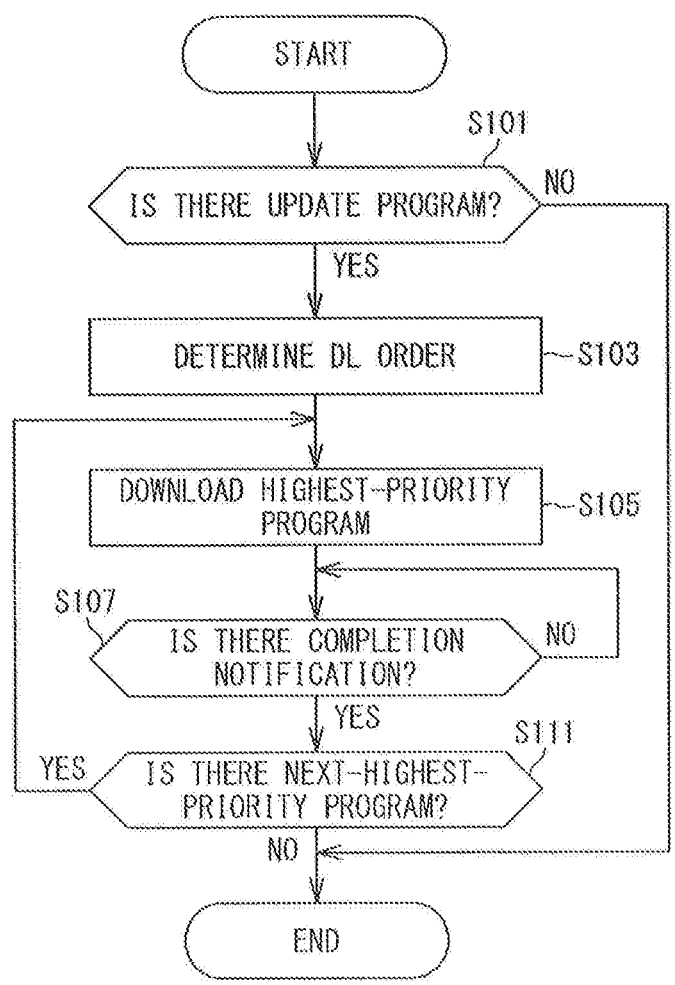
FIG. 8 is a flowchart showing a specific content of processing performed by the DL server to realize the sequence shown in FIG. 5.

FIG. 8 is a flowchart showing a specific content of processing performed by the DL server 6 to realize the sequence shown in FIG. 5. The processing shown in the flowchart of FIG. 8 is implemented mainly by the CPU 61 of the DL server 6 when the CPU 61 reads out one or a plurality of programs stored in the ROM 63 to the RAM 62 and executes the read programs. The processing shown in FIG. 8 is started when the gateway 10 requests download of an update program (step S2).

With reference to FIG. 8, in a case where a plurality of update programs to be downloaded are stored in the storage unit 64 (YES in step S101), the CPU 61 of the DL server 6 determines a DL order on the basis of one or more safety indices that are set for each of the plurality of update programs (step S103).

The CPU 61 downloads, to the gateway 10, the update program having the highest priority in the determined DL order, that is, having the highest priority level, and requests update (step S105). Upon being notified of completion of update of the control program from the corresponding target ECU 30 (step S107), the CPU 61 checks whether or not there is a next update program to be downloaded. When there is a next update program to be downloaded (YES in step S111), the CPU 61 repeats the processing from step S105. Thus, the plurality of update programs are downloaded to the gateway 10 according to the DL order determined in step S103, and the control programs are updated in the corresponding target ECU 30.

When download of the update program, having the lowest priority in the DL order and update of the corresponding control program have been completed (NO in step S111), the CPU 61 ends the series of process stops.

Effect of First Embodiment

In the program updating system according to the first embodiment, when there are a plurality of update programs to be downloaded, a download order is determined based on or more safety indices set for each update program, and the update programs are downloaded according to the download order, (hereby control programs are updated. Therefore, a control program having a higher urgency level is updated with higher priority. That is, update of a control program having a higher priority level is not hindered by an update program having a lower priority level, and update of the control program having the higher priority level can be promptly performed. Thus, safety of the vehicle can be promptly improved.

Modifications

In the above example, the DL server 6 performs download of the update programs according to the determined DL order, and requests update of the control programs. However, the DL server 6 may perform only download of the update programs. The same applies to the following embodiments. Thus, an update program having a higher priority level is downloaded with higher priority. That is, download of an update program having a higher priority level is not hindered by an update program having a lower priority level, and download of the update program having the higher priority level can be promptly performed. Thus, the earlier an update program is downloaded, the earlier the corresponding control program can be updated in the target ECU. That is, a control program having a higher priority level can be updated more promptly. Therefore, safety of the vehicle can be promptly improved.

Second Embodiment

In a program updating system according to a second embodiment, in a case where an update program is added by a provider of update programs such as an automobile manufacturer while a plurality of update programs are being downloaded to the gateway 10 according to the determined DL order, the DL server 6 determines a download order including the update program added to the plurality of update programs.

Figure 9:
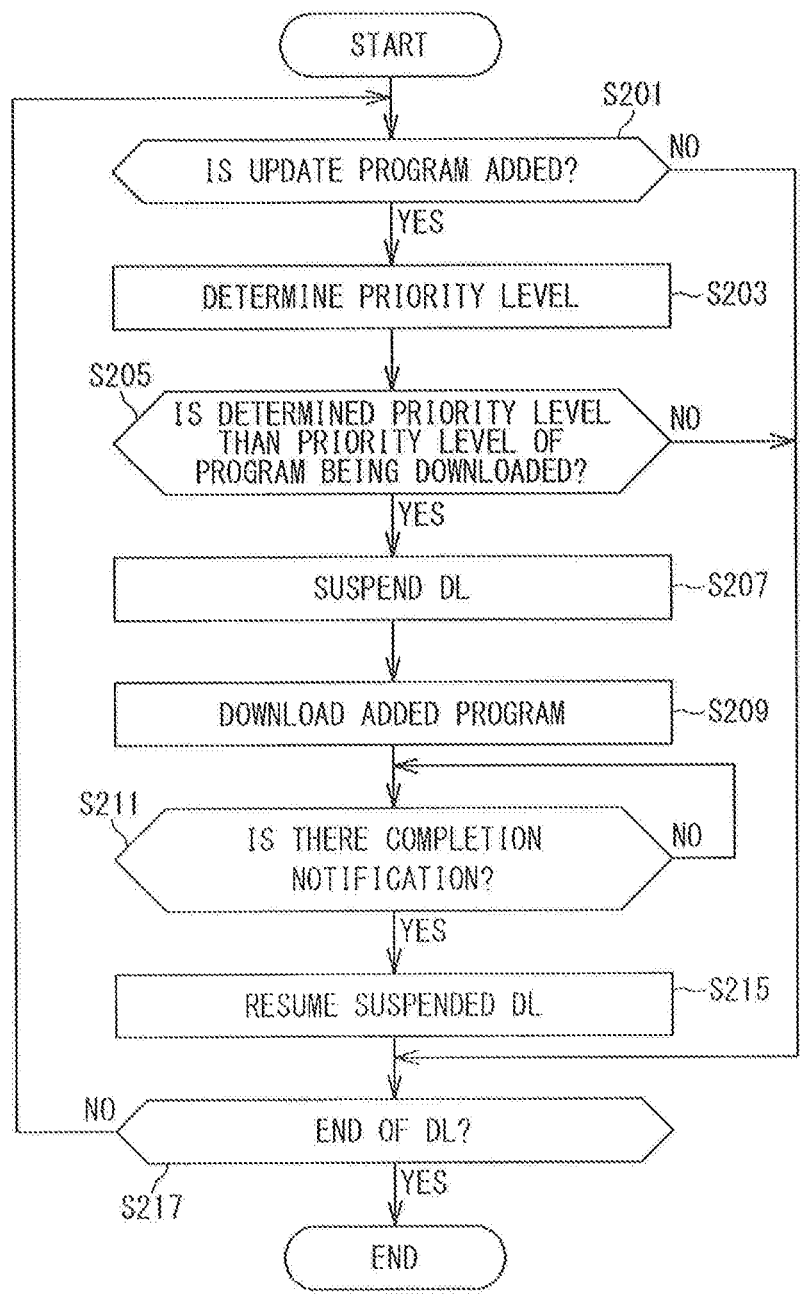
FIG. 9 is a flowchart showing a specific content of processing performed by the DL server according to a second embodiment.

FIG. 9 is a flowchart showing a specific content of processing performed by the DL server 6 according to the second embodiment. The processing shown in the flowchart of FIG. 9 is also implemented mainly by the CPU 61 of the DL server 6 when the CPU 61 reads out one or a plurality of programs stored in the ROM 63 to the RAM 62 and executes the read programs. The processing shown in FIG. 9 is executed in parallel with the process of downloading the update programs being, executed in the DL server 6.

With reference to FIG. 9, when an update program to be downloaded is added while an update program is being downloaded (YES in step S201), the CPU 61 specifies a priority level based on one or more safety indices set for the added update program (step S205). Then, the CPU 61 compares the priority level of the added update program with the priority level of the update program being downloaded.

When the priority level of the added update program is higher than the priority level of the update program be ng downloaded (YES in step S205), the CPU 61 suspends download of the update program being downloaded (step S207). Then, the CPU 61 downloads the added update program (step S209). When being notified that download of the added update program is completed and update of the corresponding target control program is completed (YES in step S211), the CPU 61 resumes the download that has been suspended in step S207 (step S215). The CPU 61 repeats the aforementioned processing until download of the update programs is completed (NO in step S217).

Effect of Second Embodiment

In the program updating system according to the second embodiment, when an update program having a higher priority level is transferred while a certain update program is being downloaded, the download is suspended, and the update program having the higher priority level is preferentially downloaded. Thus, an update program for a control program having a higher urgency level is downloaded with higher priority in a flexible manner, and update of the control program is preferentially performed. Therefore, safety of the vehicle can be promptly improved.

Modification

The aforementioned second embodiment is one example. In another example, the added update program may be downloaded after download of the update program being downloaded is completed. In this case, download of the update program being downloaded can be completed without interruption.

Third Embodiment

In the program updating system according to the first and second embodiments, the DL server 6 performs the process of determining a DL order of a plurality of update programs on the basis of one or more safety indices associated with each of the update programs, and controlling download of the update programs. However, this process may be performed by an apparatus different from the DL server 6. In another example, this process may be performed by the gateway 10.

As one example, in the program updating system according to the third embodiment, when a plurality of update programs are downloaded from the DL server 6 to the gateway 10, the gateway 10 determines a DL order of the plurality of update programs on the basis of one or more safety indices associated with each of the update programs. Then, the gateway 10 transfers the update programs to the target ECUs 30 according to the determined DL order, and requests update of control programs.

In this case, as shown in FIG. 2, the CPU 11 of the gateway 10 includes the determination Unit 111 corresponding to the determination unit 611 and the control unit 112 corresponding to the control unit 612, as functions for determining the DL order and controlling download. These functions are implemented mainly by the CPU 11 when the CPU 11 reads out one or a plurality of programs stored in the ROM 12, and executes the read programs. However, at least a part of the functions may be implemented by hardware such as an electronic circuit.

The determination unit 111 of the gateway 10 according to the third embodiment determines the priority level of each update program by using the correspondence relation between one or more safety indices and the priority level value, as in the relation graph shown in FIG. 6. The correspondence relation is stored in the DL server 6, and may be downloaded to the gateway 10 together with the update program. Alternatively, the determination unit 111 may read out and use the correspondence relation stored in the DL server 6 when determining the priority level. Still alternatively, the correspondence relation may be stored in the gateway 10. In this case, the correspondence relation itself stored in the gateway 10 may be a target to be updated. In other words, an algorithm for determining the priority levels in the determination unit 111 and a parameter used in the algorithm may be changeable. The gateway 10 receives a program or a parameter for this change from, for example, the DL server 6 or the provider of update programs such as the automobile manufacturer, and changes the algorithm or the parameter.

It is noted that the embodiments disclosed herein are merely illustrative in all aspects and should not be recognized as being restrictive. The scope of the present invention defined not by the above description but by the scope of the claims, and is intended to include meaning equivalent to the scope of the claims and all modifications within the scope.

REFERENCE SIGNS LIST 1 vehicle
2 wide-area communication network
5 management server
6 DL server
10 gateway
11, 31, 61 CPU
12, 32, 63 RAM
13, 33, 64 storage unit
14 in-vehicle communication unit
15 wireless communication unit
30 ECU
34, 65 communication unit
35 start-up unit
62 ROM
111, 611 determination unit
112, 612 control unit

The invention claimed is:

1. A control apparatus configured to control update of a control program of an on-vehicle control device which controls target equipment installed in a vehicle, the control apparatus comprising:
 a memory configured to store an update program for the control program;
 a determination unit configured to determine priority levels of a plurality of update programs stored in the memory; and
 a control unit configured to download the plurality of update programs according to the determined priority levels, in descending order of the priority levels, wherein
 the update programs are each associated with a functional safety index relating to functional safety and a security index relating to security of the vehicle and communication equipment mounted on the vehicle, and
 the determination unit determines the priority levels on the basis of the functional safety index and the security index that are associated with each of the plurality of update programs stored in the memory.

2. The control apparatus according to claim 1, wherein in a case where a new update program is stored in the memory while an update program is being downloaded, and if the priority level of the new update program is higher than the priority level of the update program being downloaded, the control unit suspends download of the update program being downloaded, and downloads the new update program.

3. The control apparatus according to claim 1, wherein in a case where a new update program is stored in the memory while an update program is being downloaded, and if the priority level of the new update program is higher than the priority level of the update program being downloaded, the control unit downloads the new update program after completion of download of the update program being downloaded.

4. The control apparatus according to claim 1, wherein the control unit downloads the plurality of update programs according to the priority levels in descending order of the priority levels, and requests update of control programs in descending order of the priority levels.

5. The control apparatus according to claim 1, wherein an algorithm for determining the priority levels of the update programs by the determination unit is changeable.

6. The control apparatus according to claim 1, wherein the determination unit determines the priority levels on the basis of a map of the priority levels, which is defined in a two-dimensional coordinate space having a first coordinate axis representing the functional safety index and a second coordinate axis representing the security index.

7. The control apparatus according to claim 1, wherein the determination unit determines the priority levels while putting greater emphasis on the functional safety index than on the security index.

8. A method of updating a control program of an on-vehicle control device which controls target equipment installed in a vehicle, the method comprising the steps of:
 storing, by a control unit, an update program for the control program in a memory;
 determining, by the control unit, priority levels of a plurality of update programs stored in the memory; and
 downloading, by the control unit, the plurality of update programs according to the determined priority levels, in descending order of the priority levels, wherein
 the update programs are each associated with a functional safety index relating to functional safety and a security index relating to security of the vehicle and communication equipment mounted on the vehicle, and
 in the step of determining the priority levels, the control unit determines the priority levels on the basis of the functional safety index and the security index that are associated with each of the plurality of update programs stored in the memory.

9. A non-transitory computer readable storage medium storing a computer program for causing a computer to function as a control apparatus configured to control update of a control program of an on-vehicle control device which controls target equipment installed in a vehicle,
 the computer including a memory configured to store an update program for the control program,
 the computer program causing the computer to function as:
 a determination unit configured to determine priority levels of a plurality of update programs stored in the memory; and
 a control unit configured to download the plurality of update programs according to the determined priority levels, in descending order of the priority levels, wherein
 the update programs are each associated with a functional safety index relating to functional safety and a security index relating to security of the vehicle and communication equipment mounted on the vehicle, and
 the determination unit determines the priority levels on the basis of the functional safety index and the security index that are associated with each of the plurality of update programs stored in the memory.

\* \* \* \* \*